US012637952B1

(12) United States Patent
Muldoon et al.

(10) Patent No.: US 12,637,952 B1
(45) Date of Patent: May 26, 2026

(54) ACOUSTIC STRUCTURES FOR AN AIRCRAFT PROPULSION SYSTEM

(71) Applicant: Raytheon Technologies Corporation, Farmington, CT (US)

(72) Inventors: Marc J. Muldoon, Marlborough, CT (US); Ramons A. Reba, South Windsor, CT (US)

(73) Assignee: RTX Corporation, Farmington, CT (US)

( * ) Notice: Subject to any disclaimer, the term of this patent is extended or adjusted under 35 U.S.C. 154(b) by 580 days.

(21) Appl. No.: 18/106,288

(22) Filed: Feb. 6, 2023

Related U.S. Application Data

(60) Provisional application No. 63/306,744, filed on Feb. 4, 2022.

(51) Int. Cl.
*F01D 9/04* (2006.01)

(52) U.S. Cl.
CPC ........ *F01D 9/041* (2013.01); *F05D 2220/323* (2013.01); *F05D 2240/12* (2013.01); *F05D 2240/14* (2013.01); *F05D 2250/283* (2013.01); *F05D 2260/963* (2013.01)

(58) Field of Classification Search
CPC ..... F01D 9/00; F01D 9/02; F01D 9/04; F01D 9/041; F01D 9/042; F01D 9/044; F01D 17/16; F01D 17/162; F01D 25/24; F05D 2260/96; F05D 2260/963; F05D 2220/323; F05D 2240/12; F05D 2240/14; F05D 2250/283
See application file for complete search history.

(56) References Cited

U.S. PATENT DOCUMENTS

| | | | |
|---|---|---|---|
| 6,764,276 | B2 | 7/2004 | Mulcaire |
| 7,334,998 | B2 | 2/2008 | Jones |
| 7,607,287 | B2 | 10/2009 | Reba |
| 8,333,552 | B2 | 12/2012 | Wood |
| 9,242,721 | B2 | 1/2016 | Neuteboom |
| 9,630,702 | B2 | 4/2017 | Alonso-Miralles |
| 10,107,191 | B2 | 10/2018 | Gilson |
| 11,199,107 | B2 | 12/2021 | Reba |
| 11,230,928 | B1 | 1/2022 | Foster |
| 11,408,349 | B2 | 8/2022 | Sawyers-Abbott |
| 11,566,564 | B2 | 1/2023 | Bifulco |

(Continued)

FOREIGN PATENT DOCUMENTS

| | | |
|---|---|---|
| EP | 2675705 B1 | 1/2017 |
| FR | 2972710 B1 | 9/2014 |

(Continued)

*Primary Examiner* — Elton K Wong
(74) *Attorney, Agent, or Firm* — Getz Balich LLC

(57) ABSTRACT

An apparatus is provided for an aircraft propulsion system. This apparatus includes a variable guide vane. The variable area vane includes an airfoil, and the variable guide vane is configured to pivot about an axis. The airfoil extends spanwise along the axis to a tip. The airfoil extends longitudinally along a camber line between a leading edge and a trailing edge. The airfoil extends laterally between a first side and a second side. The airfoil includes a vane acoustic structure. This vane acoustic structure includes a first skin and a plurality of chambers within the airfoil. The first skin at least partially forms the first side. A first of the chambers is fluidly coupled with one or more perforations in the first skin.

20 Claims, 7 Drawing Sheets

(56) References Cited

U.S. PATENT DOCUMENTS

| | | | | |
|---|---|---|---|---|
| 11,713,686 | B2 | 8/2023 | Taylor | |
| 11,719,110 | B2 | 8/2023 | Villaro Amurrio | |
| 11,802,525 | B2 | 10/2023 | Chaudhari | |
| 12,055,065 | B1 | 8/2024 | Kommareddy | |
| 2008/0253885 | A1* | 10/2008 | Foose | F02K 3/06 415/208.2 |
| 2019/0301370 | A1* | 10/2019 | Joshi | E04B 1/82 |
| 2021/0095617 | A1 | 4/2021 | Richter | |
| 2023/0212957 | A1* | 7/2023 | Zheng | F01D 25/06 |
| 2024/0240571 | A1 | 7/2024 | Wood | |

FOREIGN PATENT DOCUMENTS

| | | | |
|---|---|---|---|
| FR | 3016390 | B1 | 4/2019 |
| GB | 2361035 | A | 10/2001 |

* cited by examiner

ACOUSTIC STRUCTURES FOR AN AIRCRAFT PROPULSION SYSTEM

This application claims priority to U.S. Patent Appln. No. 63/306,744 filed Feb. 4, 2022, which is hereby incorporated herein by reference in its entirety.

BACKGROUND OF THE DISCLOSURE

1. Technical Field

This disclosure relates generally to an aircraft propulsion system and, more particularly, to sound attenuation for the aircraft propulsion system.

2. Background Information

Various types and configurations of acoustic structures are known in the art for attenuating aircraft propulsion system noise. While these known acoustic structures have various benefits, there is still room in the art for improvement. There is a need in the art therefore for improve acoustic structures for an aircraft propulsion system.

SUMMARY OF THE DISCLOSURE

According to an aspect of the present disclosure, an apparatus is provided for an aircraft propulsion system. This apparatus includes a variable guide vane. The variable area vane includes an airfoil, and the variable guide vane is configured to pivot about an axis. The airfoil extends spanwise along the axis to a tip. The airfoil extends longitudinally along a camber line between a leading edge and a trailing edge. The airfoil extends laterally between a first side and a second side. The airfoil includes a vane acoustic structure. This vane acoustic structure includes a first skin and a plurality of chambers within the airfoil. The first skin at least partially forms the first side. A first of the chambers is fluidly coupled with one or more perforations in the first skin.

According to another aspect of the present disclosure, another apparatus is provided that includes an open rotor aircraft propulsion system. This open rotor aircraft propulsion system includes an airfoil. The airfoil extends spanwise along an axis to a tip. The airfoil extends longitudinally along a camber line between a leading edge and a trailing edge. The airfoil extends laterally between a first side and a second side. The airfoil includes an acoustic structure. The acoustic structure includes a first skin and a plurality of chambers within the airfoil. The first skin at least partially forms the first side. A first of the chambers is fluidly coupled with one or more perforations in the first skin.

According to still another aspect of the present disclosure, another apparatus is provided that includes an open rotor aircraft propulsion system. This open rotor aircraft propulsion system includes an open propulsor rotor, a guide vane array, an engine core and a housing for the engine core. The guide vane array includes a plurality of guide vanes arranged circumferentially about and projecting out from an exterior side of the housing. The housing includes an acoustic structure downstream of the open propulsor rotor. The acoustic structure includes an exterior skin and a plurality of chambers. The exterior skin at least partially forms the exterior side of the housing. A first of the chambers is fluidly coupled with one or more perforations in the exterior skin.

The open rotor aircraft propulsion system may include a guide vane. The guide vane may include the airfoil.

The airfoil may be configured to pivot about the axis.

The open rotor aircraft propulsion system may include an open propulsor rotor and a guide vane array. The guide vane array include the airfoil. The guide vane array is arranged with and downstream of the open propulsor rotor.

The open rotor aircraft propulsion system may also include an engine core and a housing for the engine core. The housing may include a housing acoustic structure and an exterior side. The housing acoustic structure may include an exterior skin and a plurality of housing chamber. The exterior skin may at least partially form the exterior side. A first of the plurality of housing chambers may be fluidly coupled with one or more perforations in the exterior skin. The airfoil may project out from the housing at the exterior side.

The first side may be a pressure side of the airfoil. The second side may be a suction side of the airfoil.

The first side may be a suction side of the airfoil. The second side may be a pressure side of the airfoil.

The vane acoustic structure may also include a cellular core and a second skin. The cellular core may form the chambers laterally between the first skin and the second skin. The second skin may at least partially form the second side.

The second skin may be or otherwise include a non-perforated skin.

The cellular core may be or otherwise include a honeycomb core.

The apparatus may also include an actuator system configured to pivot the variable guide vane about the axis to actively tune noise suppression of the vane acoustic structure.

The actuator system may also be configured to pivot the variable guide vane about the axis to actively de-swirl an incoming airflow.

The vane acoustic structure may extend a length along a span of the airfoil. The length may be equal to or greater than seventy-five percent of the span.

The vane acoustic structure may extend a length along a span of the airfoil. The length may be less than seventy-five percent of the span.

The apparatus may also include a vane support structure. The variable guide vane may project out from and/or may be cantilevered from the vane support structure.

The apparatus may also include a housing of the aircraft propulsion system. The housing may include a housing acoustic structure and an exterior side. The housing acoustic structure may include an exterior skin and a plurality of housing chambers. The exterior skin may at least partially form the exterior side. A first of the housing chambers may be fluidly coupled with one or more perforations in the exterior skin. The airfoil may project out from the housing at the exterior side.

The aircraft propulsion system may be configured as an open rotor aircraft propulsion system. The variable guide vane may be arranged at an exterior of the open rotor aircraft propulsion system.

The apparatus may include an open propulsor rotor and a guide vane array. The guide vane array may include the variable guide vane. The guide vane array may be configured to de-swirl air propelled by the open propulsor rotor.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
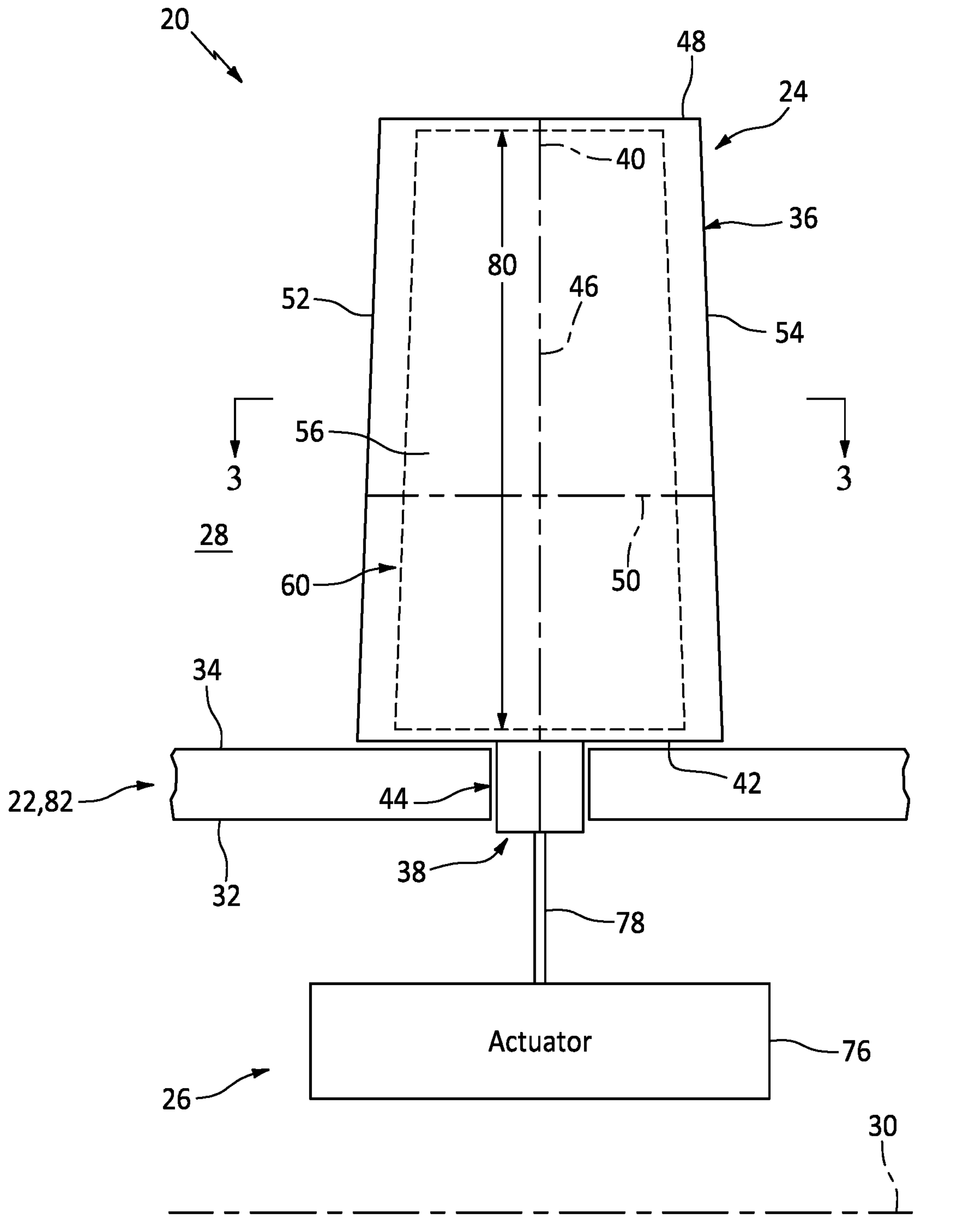
FIG. 1 is a partial schematic illustration of an assembly for an aircraft propulsion system.

FIG. 1 illustrates an assembly 20 for an aircraft propulsion system. This propulsion system assembly 20 includes a vane support structure 22, one or more (e.g., variable) guide vanes 24 and an actuator system 26.

Figure 2:
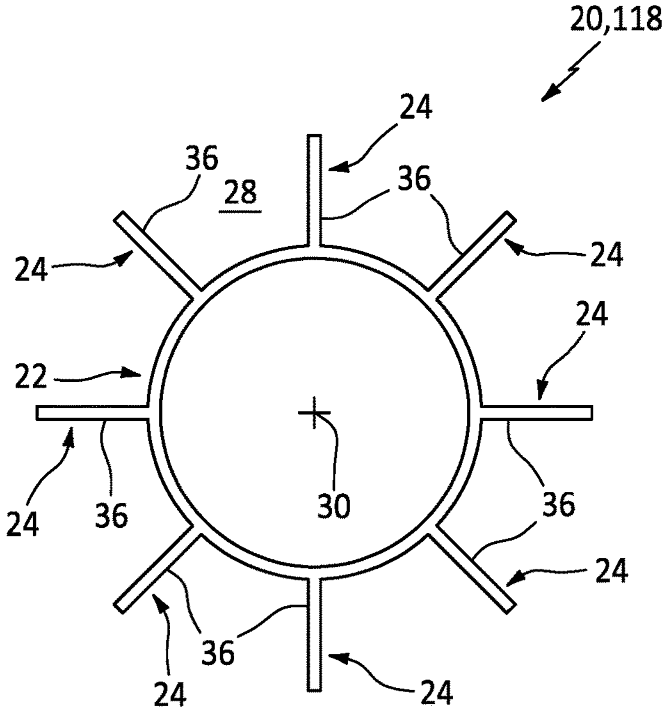
FIG. 2 is an end view schematic illustration of a guide vane array.

The vane support structure 22 is configured to support the one or more guide vanes 24. The vane support structure 22 is also configured to form a (e.g., inner) peripheral boundary of a (e.g., exterior) flowpath 28 for the propulsion system assembly 20. The vane support structure 22 of FIG. 1, for example, extends axially along an axial centerline 30, which axial centerline 30 may be a rotational axis of the aircraft propulsion system. The vane support structure 22 extends radially between and to a radial inner side 32 of the vane support structure 22 and a radial outer side 34 of the vane support structure 22, which structure outer side 34 at least partially forms the peripheral boundary of the flowpath 28. Referring to FIG. 2, the vane support structure 22 extends circumferentially about (e.g., completely around) the axial centerline 30, which may thereby provide the vane support structure 22 with a full-hoop, tubular body.

The guide vanes 24 are distributed circumferentially about the axial centerline 30 in an annular array. Referring to FIG. 1, each of the guide vanes 24 projects radially out from and may be cantilevered from the vane support structure 22. Each of the guide vanes 24 of FIG. 1, for example, includes a vane airfoil 36 and a vane mount 38 (e.g., a shaft) configured to pivotally mount the vane airfoil 36 to the vane support structure 22. The vane mount 38 of FIG. 1 projects along a pivot axis 40 of the respective guide vane 24 (e.g., radially relative to the axial centerline 30) out from a base 42 of the vane airfoil 36 and into a respective mount aperture 44 in the vane support structure 22. The pivot axis 40 of FIG. 1 is angularly offset from (e.g., perpendicular to) the axial centerline 30.

Figure 3:
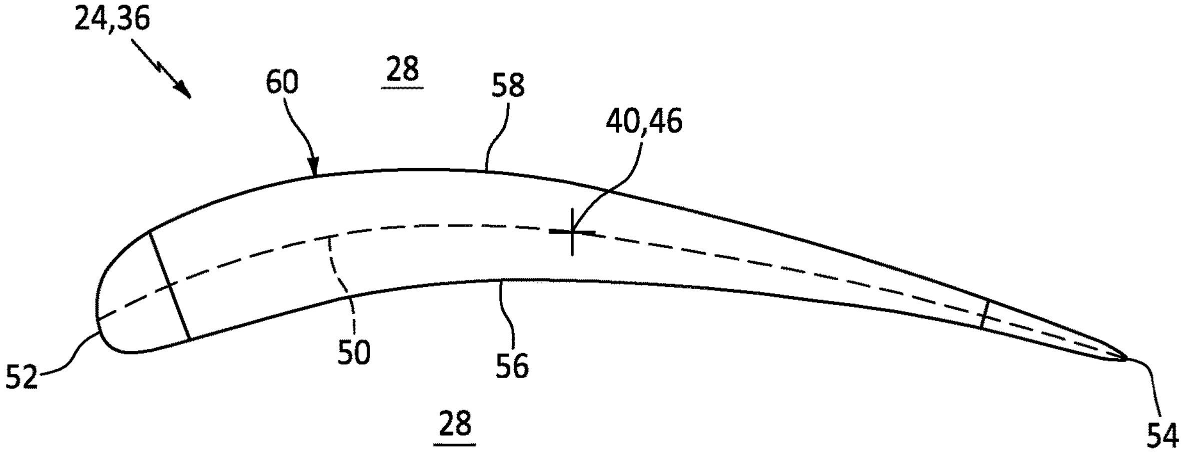
FIG. 3 is a schematic sectional illustration of a guide vane airfoil taken along line 3-3 in FIG. 1.

The vane airfoil 36 of FIG. 1 extends spanwise along the pivot axis 40 and a span 46 of the vane airfoil 36 from the airfoil base 42 to a distal (e.g., unsupported, unshrouded, unducted, etc.) tip 48 of the vane airfoil 36. The vane airfoil 36 extends longitudinally along a camber line 50 of the vane airfoil 36 between and to a leading edge 52 of the vane airfoil 36 and a trailing edge 54 of the vane airfoil 36. Referring to FIG. 3, the vane airfoil 36 extends laterally (e.g., widthwise, circumferentially about the axial centerline 30) between and to a (e.g., concave) pressure side 56 of the vane airfoil 36 and a (e.g., convex) suction side 58 of the vane airfoil 36. Each of these airfoil sides 56 and 58 extends spanwise from the airfoil base 42 to the airfoil tip 48 (see FIG. 1). Each of the airfoil sides 56 and 58 extends longitudinally between and may meet at the airfoil leading edge 52 and the airfoil trailing edge 54.

The vane airfoil 36 of FIGS. 1 and 3 includes a vane acoustic structure 60; e.g., an embedded acoustic panel. This acoustic structure 60 is configured to control unsteady aerodynamic interaction between the rotor and vane and thereby reduce sound generation (e.g. noise generation). In addition the acoustic structure 60 is configured to attenuate sound (e.g., noise) propagating along the flowpath 28 and the vane airfoil 36. The acoustic structure 60 of FIG. 4, for example, includes a fluid permeable (e.g., perforated) face skin 62, a fluid impermeable (e.g., non-perforated) back skin 64 and a cellular core 66.

The face skin 62 is configured as an exterior skin of the acoustic structure 60 and, more generally the vane airfoil 36. The face skin 62 of FIG. 4, for example, partially or completely forms the airfoil pressure side 56, or alternatively the airfoil suction side 58. The face skin 62 includes a plurality of perforations 68; e.g., apertures such as through-holes. Each of these face skin perforations 68 extends laterally through the face skin 62.

The back skin 64 may also be configured as an exterior skin of the acoustic structure 60 and, more generally, the vane airfoil 36. The back skin 64 of FIG. 4, for example, partially or completely forms the airfoil suction side 58, or alternatively the airfoil pressure side 56. The back skin 64 of FIG. 4 is configured as a continuous, uninterrupted and/or non-porous skin; e.g., a skin without any perforations aligned with the cellular core 66.

The cellular core 66 is arranged laterally between the face skin 62 and the back skin 64. The cellular core 66 of FIG. 4, for example, extends laterally between and to the face skin 62 and the back skin 64. The cellular core 66 may also be connected to (e.g., formed integral with or attached to) the face skin 62 and/or the back skin 64.

The cellular core 66 forms one or more internal chambers 70 (e.g., acoustic resonance chambers, cavities, etc.) laterally between the face skin 62 and the back skin 64. The cellular core 66 of FIG. 5A, for example, includes a cellular core structure 72 with a plurality of corrugated sidewalls 74. These corrugated sidewalls 74 are arranged in a side-by-side array and are connected to one another such that each adjacent (e.g., neighboring) pair of the corrugated sidewalls 74 forms an array of the internal chambers 70 (e.g., spanwise and/or longitudinally) therebetween. While the corrugated sidewalls 74 may be discrete elements, referring now to FIG. 5B, some or all of the corrugated sidewalls 74 may alternatively be formed integral with one another. Such an integrated sidewall structure may be formed using additive manufacturing and/or other manufacturing processes.

Figure 4:
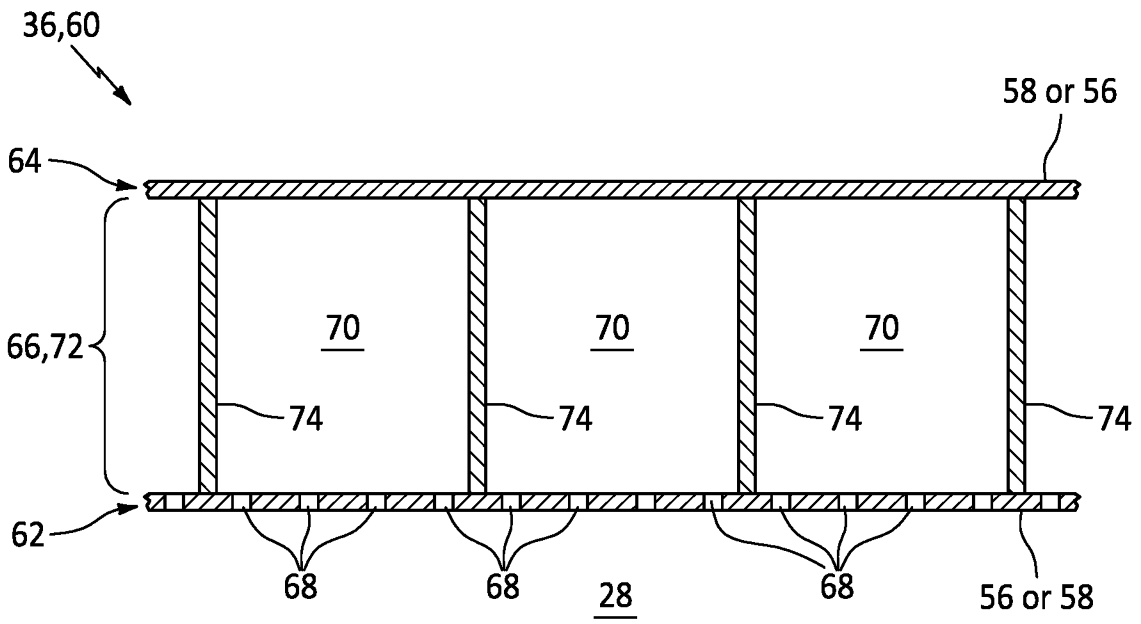
FIG. 4 is a side sectional illustration of a portion of an acoustic structure for the guide vane airfoil.

Each of the internal chambers 70 of FIG. 4 extends laterally within/through the cellular core 66 between and to the face skin 62 and the back skin 64. One or more of all of the internal chambers 70 may thereby each be fluidly coupled with a respective set of one or more of the face skin perforations 68.

Figure 5A:
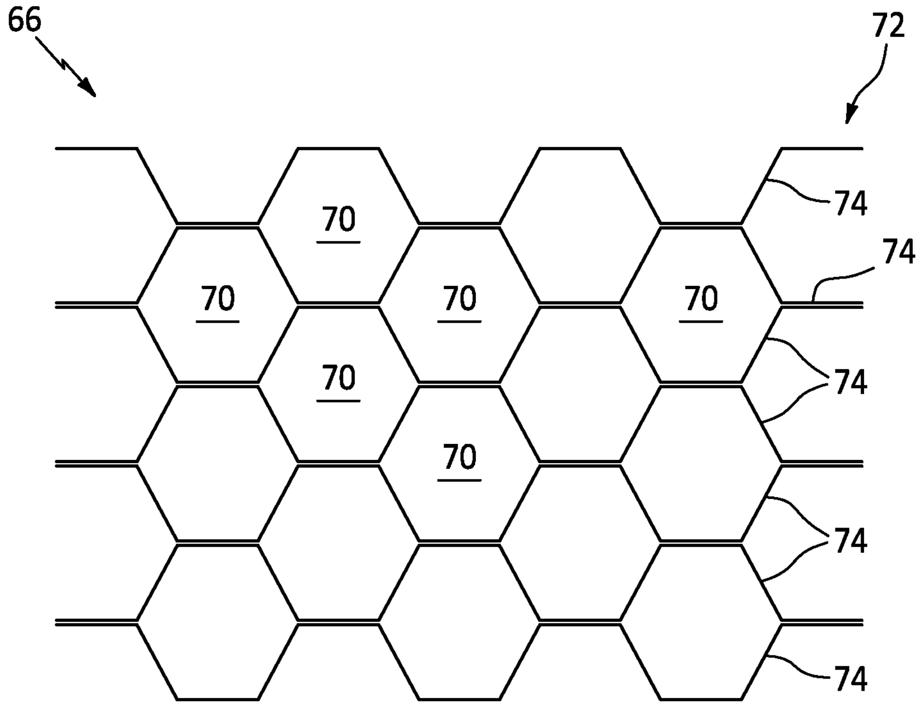
FIGS. 5A and 5B are illustrations of various cellular core arrangements.
Figure 5B:
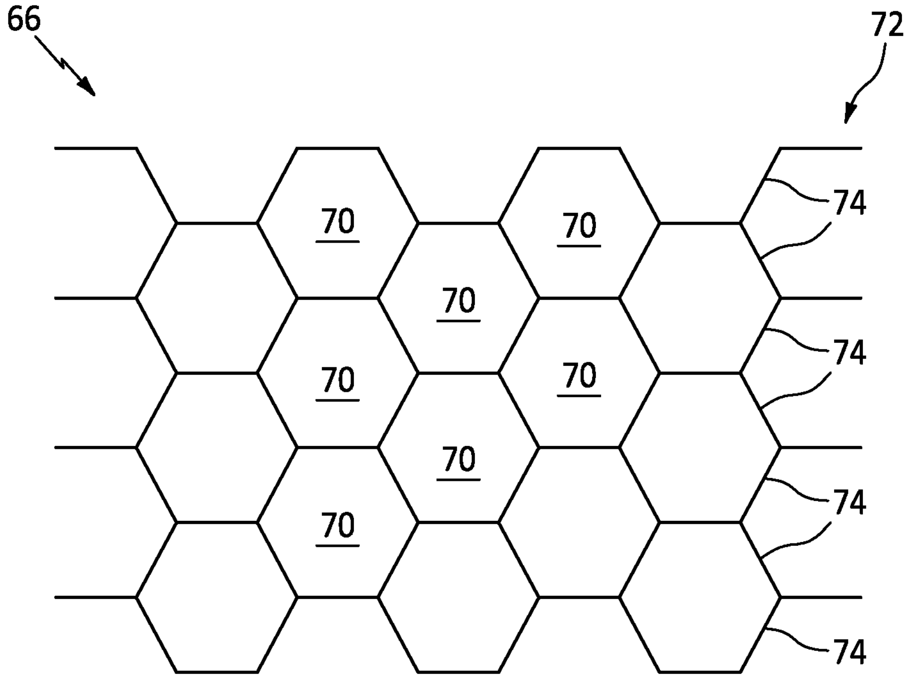

Each of the internal chambers 70 has a first chamber sectional geometry (e.g., shape, size, etc.) when viewed in a first reference plane; e.g., the plane of FIG. 4. This first chamber sectional geometry may have a polygonal shape; e.g., a rectangular shape. Referring to FIGS. 5A and 5B, each of the internal chambers 70 has a second chamber sectional geometry (e.g., shape, size, etc.) when viewed in a second reference plane; e.g., the plane of FIG. 5A, 5B. This second chamber sectional geometry may have a polygonal shape; e.g., a hexagonal shape. With such a configuration, the cellular core structure 72 may be a honeycomb core. The present disclosure, however, is not limited to foregoing exemplary cellular core configuration. For example, one or more or all of the internal chambers 70 may each alternatively have a circular, elliptical or other non-polygonal cross-sectional geometry. Furthermore, various other types of honeycomb cores and, more generally, various other types of cellular cores for an acoustic panel are known in the art, and the present disclosure is not limited to any particular ones thereof.

Figure 6:
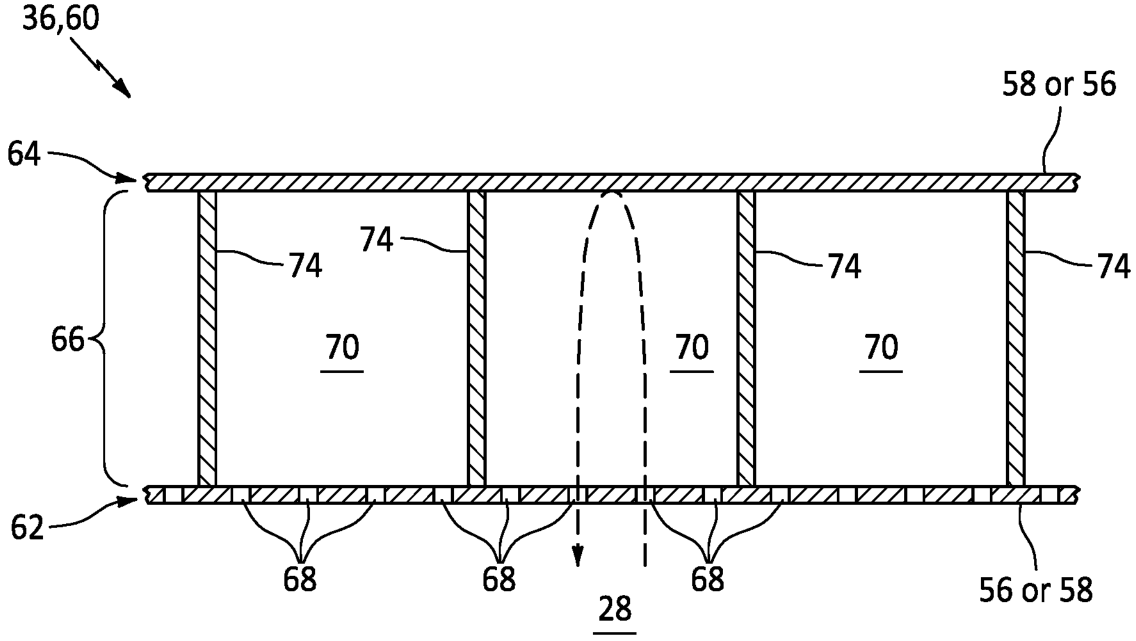
FIG. 6 is a side sectional illustration of a portion of the acoustic structure depicted with an exemplary sound wave trajectory.

Referring to FIG. 6, the acoustic structure 60 may be configured as a single-degree of freedom (SDOF) acoustic structure. Sound waves propagating within the flowpath 28, for example, may enter the acoustic structure 60 and its internal chambers 70 through the face skin perforations 68. Within each internal chamber 70, the sound waves may travel from the respective face skin perforation(s) 68, laterally and/or otherwise through the respective internal chamber 70, to the back skin 64.

While the acoustic structure 60 is described above as a single-degree of freedom (SDOF) acoustic structure, the present disclosure is not limited thereto. For example, in other embodiments, the acoustic structure 60 may alternatively be configured as a multi-degree of freedom (MDOF) acoustic structure; e.g., a double-degree of freedom (DDOF) acoustic structure. One or more or all of the internal chambers 70, for example, may each be provided with at least one fluid-permeable (e.g., perforated) septum.

Referring to FIG. 1, the actuator system 26 is configured to move one or more or all of the guide vanes 24. The actuator system 26, more particularly, is configured to pivot each respective guide vane 24 and its vane airfoil 36 about the respective pivot axis 40. The actuator system 26 of FIG. 1, for example, includes at least one actuator 76 and a linkage system 78 motively coupling the actuator 76 to each respective guide vane 24 and its vane mount 38.

During aircraft propulsion system operation, the actuator system 26 may pivot the guide vanes 24 to actively tune (e.g., adjust, optimize, maximize, minimize, etc.) one or more aircraft propulsion system parameters such as, but not limited to, swirl and noise suppression. The actuator system 26, for example, may pivot one or more or all of the guide vanes 24 and their vane airfoils 36 to de-swirl a fluid propelled by an upstream rotor; e.g., an open propulsor rotor for an open rotor aircraft propulsion system with a tractor configuration. The actuator system 26 may also or alternatively pivot one or more or all of the guide vanes 24 and their vane airfoils 36 to condition a fluid entering a downstream rotor; e.g., an open propulsor rotor for an open rotor aircraft propulsion system with a pusher configuration. The actuator system 26 may also or alternatively pivot one or more or all of the guide vanes 24 and their vane airfoils 36 to increase noise suppression of the acoustic structures 60. In some embodiments, circumferentially varying vane positions may be scheduled to beneficially introduce sound cancellation through circumferential phase variation of the vane unsteady aerodynamic response and to maximize effectiveness of the acoustic structure 60, for example at operating conditions where noise is a particular concern. In some embodiments, unsteady vane actuation may be employed at harmonics or sub-harmonics of critical frequencies to further minimize unsteady aerodynamic interaction and sound generation. The actuator system 26, of course, may also or alternatively adjust positions of one or more or all of the guide vanes 24 and their vane airfoils 36 to tune various other aircraft propulsion system parameters or, more generally, aircraft parameters.

Figure 7:
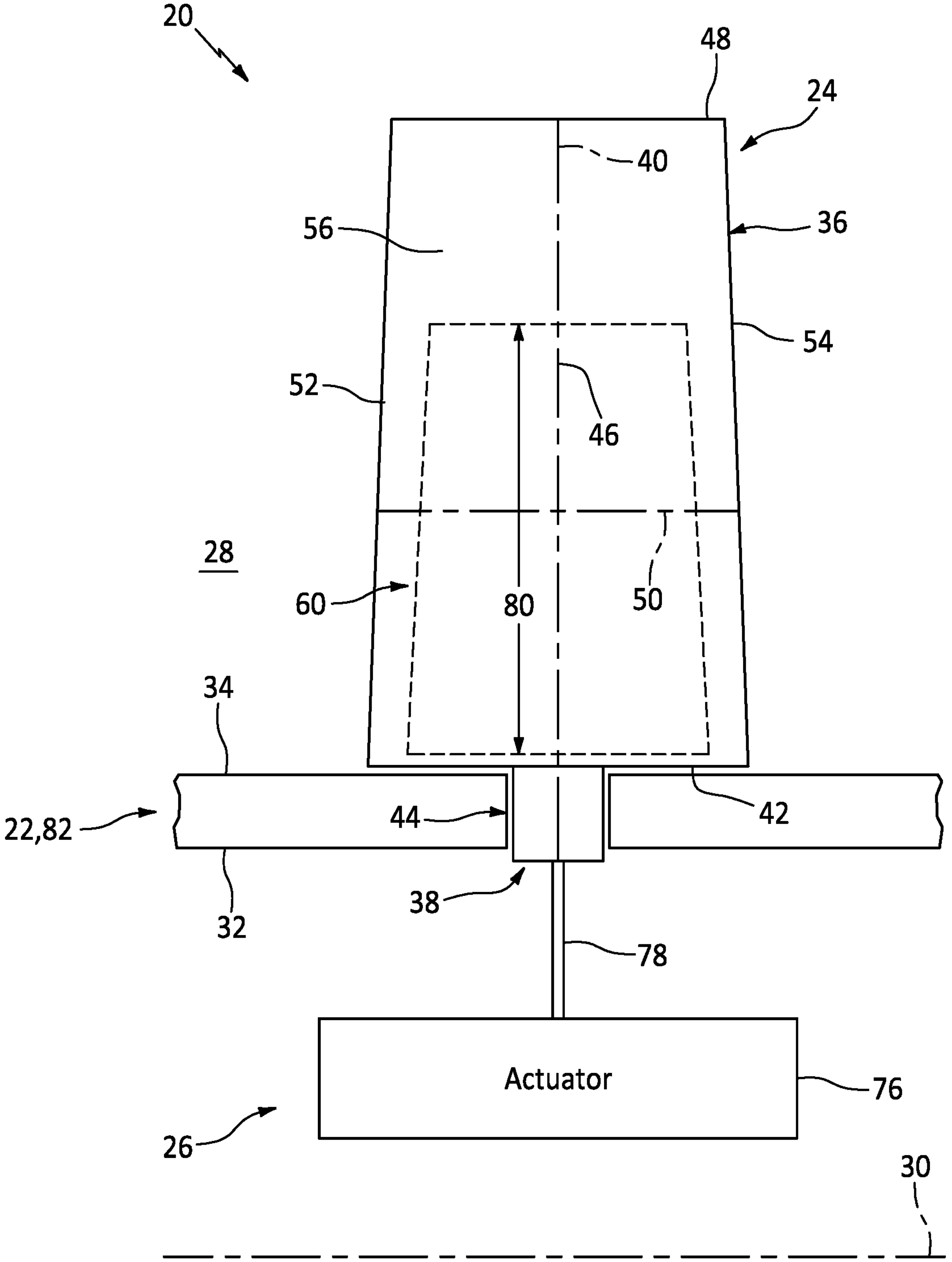
FIG. 7 is a partial schematic illustration of the assembly with another acoustic structure arrangement.

In some embodiments, referring to FIG. 1, each acoustic structure 60 extends spanwise along the pivot axis 40 for a length 80 of the span 46. This structure length 80 may be equal to or greater than a threshold percentage of the span 46, where the threshold percentage may be fifty percent, seventy-five percent or ninety-five to one hundred percent. The acoustic structure 60 of FIG. 1, for example, may provide acoustic attenuation and control of unsteady aerodynamic interaction along substantially the entire span 46 of the vane airfoil 36. In other embodiments, referring to FIG. 7, the structure length 80 may be less than the threshold percentage of the span 46. The acoustic structure 60 of FIG. 7, for example, may provide acoustic attenuation and control of unsteady aerodynamic interaction along a select portion of the span 46 of the vane airfoil 36 which, for example, is closer to propagating sound waves.

In some embodiments, one or more or all of the guide vanes 24 may each be configured as a variable (e.g., pivotable) guide vane as described above. In other embodiments, however, one or more or all of the guide vanes 24 may each be configured as a stationary (e.g., fixed) guide vane. Such fixed guide vanes may be fixed to the vane support structure 22.

Figure 8:
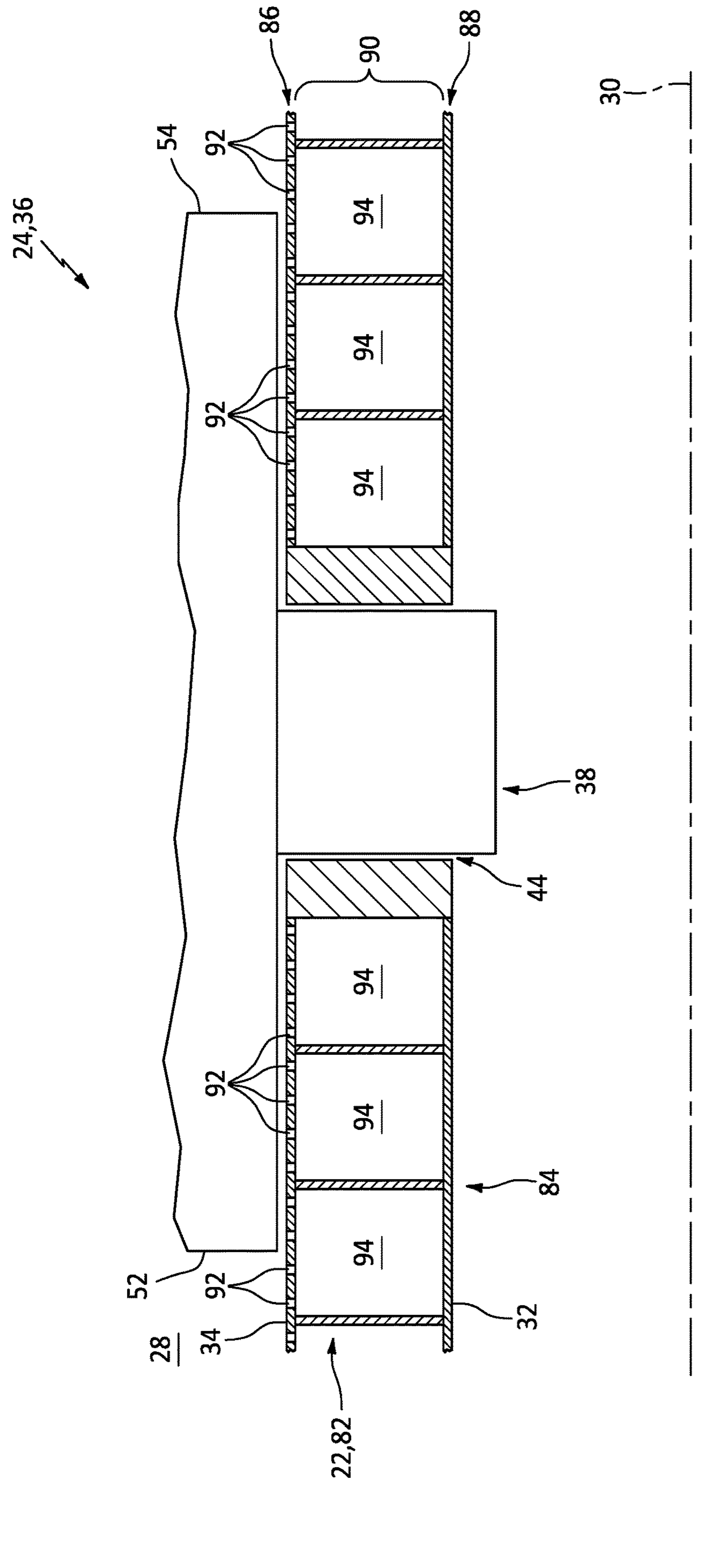
FIG. 8 is a partial schematic illustration of the assembly configured with another acoustic structure.

Referring to FIG. 8, to provide additional or alternative sound attenuation, a housing 82 for the aircraft propulsion system may also (or alternatively) be configured with at least one acoustic structure 84; e.g., an embedded acoustic panel. This housing acoustic structure 84 is configured to attenuate sound (e.g., noise) propagating along the flowpath 28 and the housing 82. The housing 82 of FIG. 8 includes the vane support structure 22. The housing acoustic structure 84 may be configured as a part of the vane support structure 22. At least a portion or an entirety of the housing acoustic structure 84 may also or alternatively be disposed upstream of and/or downstream of the vane support structure 22 and/or the guide vanes 24. The housing acoustic structure 84 of FIG. 8 includes a fluid permeable (e.g., perforated) face skin 86, a fluid impermeable (e.g., non-perforated) back skin 88 and a cellular core 90. In some embodiments, the vane positions can be scheduled to modify the radial distribution of unsteady aerodynamic loading to maximize interaction of the resulting sound with the housing 82 and thereby increase (e.g., maximize) sound attenuation.

The face skin 86 is configured as an exterior skin of the housing acoustic structure 84 and, more generally the housing 82. The face skin 86 of FIG. 8, for example, at least partially forms the peripheral boundary of the flowpath 28. The face skin 86 includes a plurality of perforations 92; e.g., apertures such as through-holes. Each of these face skin perforations 92 extends radially (e.g., relative to the axial centerline 30) through the face skin 86.

The back skin 88 may also be configured as an interior skin of the housing acoustic structure 84 and, more generally, the housing 82. The back skin 88 of FIG. 8 is configured as a continuous, uninterrupted and/or non-porous skin; e.g., a skin without any perforations aligned with the cellular core.

The cellular core 90 is arranged radially (e.g., relative to the axial centerline 30) between the face skin 86 and the back skin 88. The cellular core 90 of FIG. 8, for example, extends radially between and to the face skin 86 and the back skin 88. The cellular core 90 may also be connected to (e.g., formed integral with or attached to) the face skin 86 and/or the back skin 88.

The cellular core 90 forms one or more internal chambers 94 (e.g., acoustic resonance chambers, cavities, etc.) radially between the face skin 86 and the back skin 88. Each of the internal chambers 94 of FIG. 8 extends radially within/through the cellular core 90 between and to the face skin 86 and the back skin 88. One or more of all of the internal chambers 94 may thereby each be fluidly coupled with a respective set of one or more of the face skin perforations 92.

This cellular core 90 may have a similar (e.g., honeycomb core) structure as the cellular core 66 described above; e.g., see FIGS. 5A and 5B. The structure of the cellular core 90, therefore, is not described in further detail for ease of description. The present disclosure, however, is not limited to any particular cellular core structures. Furthermore, it is contemplated the cellular cores 66 and 90 may be of different types and/or configurations.

The acoustic structure 60 may also or alternatively include one or more elements other than those described above. The acoustic structure 60, for example, may include one or more septums, baffles, walls, etc. The acoustic structure 60 may also have configurations other than those described above. Examples of other suitable acoustic structures, for example, are described in U.S. Pat. Nos. 7,607,287 and 11,199,107, the disclosures of which are hereby incorporated by reference in their entireties. The present disclosure therefore is not limited to any particular acoustic structure type or configuration.

Figure 9:
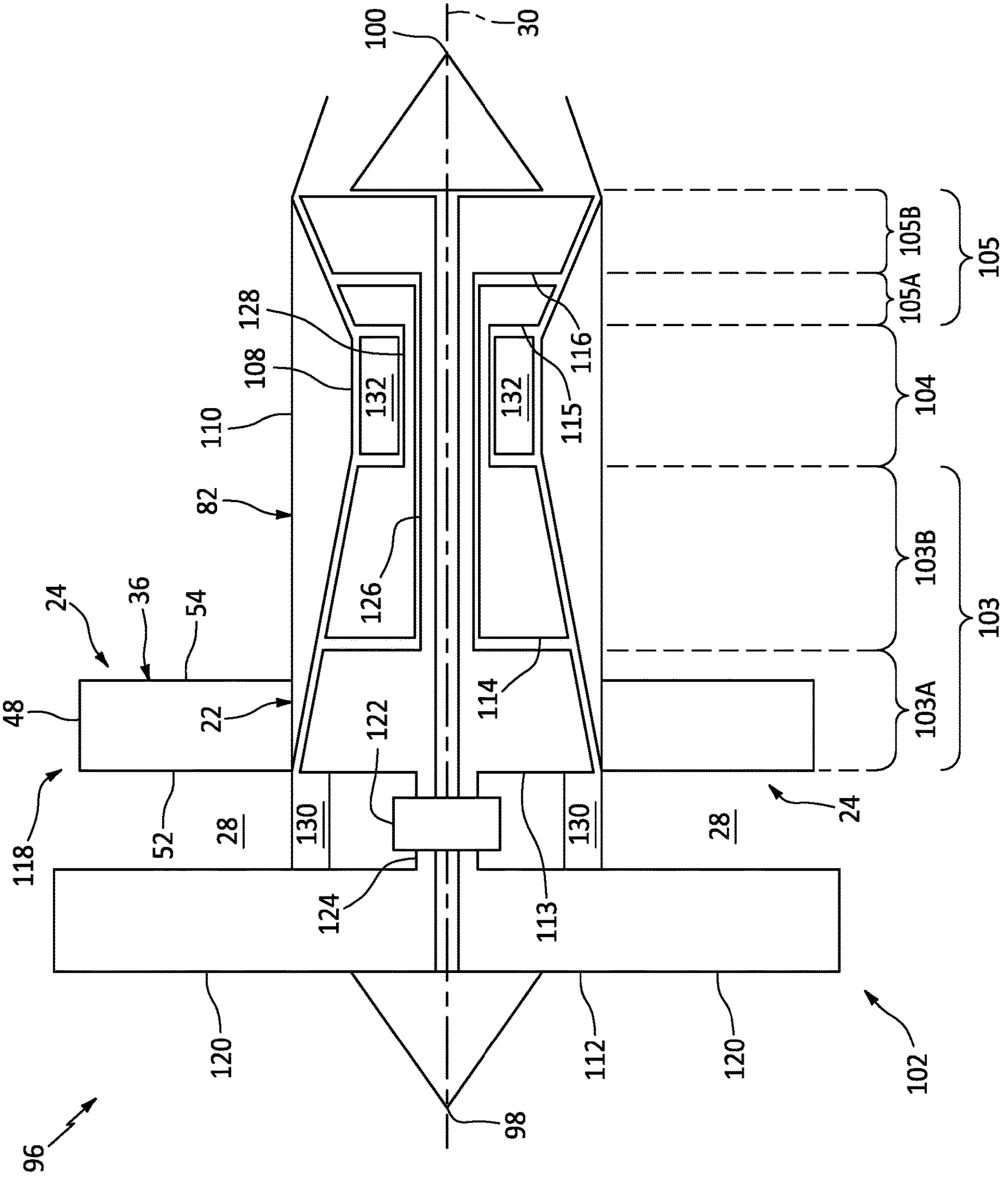
FIG. 9 is a side sectional schematic illustration of the aircraft propulsion system with an open propulsor rotor.

Various types of aircraft propulsion systems may include the propulsion system assembly 20. An example of such an aircraft propulsion system is shown in FIG. 9, which propulsion system is configured as an open rotor aircraft propulsion system 96 with a tractor configuration. This aircraft propulsion system 96 of FIG. 9 extends axially along the axial centerline 30 between a forward, upstream end 98 and an aft, downstream end 100. The aircraft propulsion system 96 includes a propulsor (e.g., an un-ducted fan) section 102, a compressor section 103, a combustor section 104 and a turbine section 105. The compressor section 103 includes a low pressure compressor (LPC) section 103A and a high pressure compressor (HPC) section 103B. The turbine section 105 includes a high pressure turbine (HPT) section 105A and a low pressure turbine (LPT) section 105B.

The engine sections 102-105B are arranged sequentially along the axial centerline 30 between the upstream end 98 and the downstream end 100. The propulsor section 102 is configured outside of the housing 82 of the aircraft propulsion system 96 at an exterior of the aircraft propulsion system 96. The engine sections 103A-105B are arranged within the housing 82. The housing 82 of FIG. 9, for example, includes a case 108 and a nacelle 110. The case 108 houses one or more of the engine sections 103A-105B; e.g., an engine core. The nacelle 110 houses and provides an aerodynamic cover for the case 108. The housing acoustic structure 84 of FIG. 8 may be configured as part of the nacelle 110 at an outer peripheral boundary of the housing 82.

Each of the engine sections 102, 103A, 103B, 105A and 105B includes a respective bladed rotor 112-116. Each of these bladed rotors 112-116 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

A guide vane array 118, which includes the guide vanes 24 (e.g., see FIGS. 1 and 8), is arranged at an exterior of the aircraft propulsion system 96. The guide vane array 118 and its guide vanes 24 are located downstream along an open bypass flowpath (e.g., the exterior flowpath 28) from the open propulsor rotor 112 and its open rotor propulsor blades 120. The open bypass flowpath (e.g., 28) is outboard of the housing 82 and, thus, bypasses the engine core.

The propulsor rotor 112 is connected to a gear train 122, for example, through a propulsor shaft 124. The gear train 122 and the LPC rotor 113 are connected to and driven by the LPT rotor 116 through a low speed shaft 126. The HPC rotor 114 is connected to and driven by the HPT rotor 115 through a high speed shaft 128.

During operation, an inner stream of air propelled by the propulsor rotor 112 enters a core flowpath 130 (e.g., an internal flowpath) within the aircraft propulsion system 96. This core flowpath 130 extends sequentially through the engine sections 103A-105B. The air within the core flowpath 130 may be referred to as core air. This core air is compressed by the LPC rotor 113 and the HPC rotor 114 and directed into a combustion chamber 132 of a combustor in the combustor section 104. Fuel is injected into the combustion chamber 132 and mixed with the compressed core air to provide a fuel-air mixture. This fuel-air mixture is ignited and combustion products thereof flow through and sequentially cause the HPT rotor 115 and the LPT rotor 116 to rotate. The rotation of the HPT rotor 115 and the LPT rotor 116 respectively drive rotation of the HPC rotor 114 and the LPC rotor 113 and, thus, compression of the air received from a core airflow inlet. The rotation of the LPT rotor 116 also drives rotation of the propulsor rotor 112, which propels an outer stream of air outside of the housing 82 via the bypass flowpath (e.g., 28) thereby bypassing the engine core. The propulsion of the outer stream of air may account for a majority of thrust generated by the aircraft propulsion system 96, e.g., more than seventy-five percent (75%) of thrust. The aircraft propulsion system 96 of the present disclosure, however, is not limited to the foregoing exemplary thrust ratio.

While the guide vanes 24 and their vane airfoils 36 may be arranged at an exterior of an aircraft propulsion system as described above, the guide vanes 24 and their vane airfoils 36 may also or alternatively be arranged within an interior of an aircraft propulsion system. The guide vanes 24, for example, may alternatively be configured as fan exit guide vanes downstream of a ducted fan section of a turbofan propulsion system. In another example, the guide vanes 24 may alternatively be configured as inlet guide vanes within an inlet to a turbojet propulsion system. The present disclosure therefore is not limited to exterior guide vane applications. Furthermore, the propulsion system assembly 20 can also be included in various types of aircraft propulsion systems other than those described above; e.g., a pusher fan propulsion system, etc.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An apparatus for an aircraft propulsion system, comprising:

a variable guide vane comprising an airfoil, the variable guide vane configured to pivot about an axis;

the airfoil extending spanwise along the axis to a tip, the airfoil extending longitudinally along a camber line between a leading edge and a trailing edge, the airfoil extending laterally between a first side and a second side, and the airfoil comprising a vane acoustic structure; and the vane acoustic structure including a first skin and a plurality of chambers within the airfoil, the first skin at least partially forming the first side, and a first of the plurality of chambers fluidly coupled with one or more perforations in the first skin.

2. The apparatus of claim 1, wherein the first side comprises a pressure side of the airfoil; and the second side comprises a suction side of the airfoil.

3. The apparatus of claim 1, wherein the first side comprises a suction side of the airfoil; and the second side comprises a pressure side of the airfoil.

4. The apparatus of claim 1, wherein the vane acoustic structure further includes a cellular core and a second skin;

the cellular core forms the plurality of chambers laterally between the first skin and the second skin; and the second skin at least partially forms the second side.

5. The apparatus of claim 4, wherein the second skin is a non-perforated skin.

6. The apparatus of claim 4, wherein the cellular core comprises a honeycomb core.

7. The apparatus of claim 1, further comprising an actuator system configured to pivot the variable guide vane about the axis to actively tune noise suppression of the vane acoustic structure.

8. The apparatus of claim 7, wherein the actuator system is further configured to pivot the variable guide vane about the axis to actively de-swirl an incoming airflow.

9. The apparatus of claim 1, wherein the vane acoustic structure extends a length along a span of the airfoil; and the length is equal to or greater than seventy-five percent of the span.

10. The apparatus of claim 1, wherein the vane acoustic structure extends a length along a span of the airfoil; and the length is less than seventy-five percent of the span.

11. The apparatus of claim 1, further comprising:

a vane support structure;

the variable guide vane projecting out from and cantilevered from the vane support structure.

12. The apparatus of claim 1, further comprising:

a housing of the aircraft propulsion system, the housing including a housing acoustic structure and an exterior side;

the housing acoustic structure including an exterior skin and a plurality of housing chambers, the exterior skin at least partially forming the exterior side, and a first of the plurality of housing chambers fluidly coupled with one or more perforations in the exterior skin; and the airfoil projecting out from the housing at the exterior side.

13. The apparatus of claim 1, wherein the aircraft propulsion system is configured as an open rotor aircraft propulsion system; and the variable guide vane is arranged at an exterior of the open rotor aircraft propulsion system.

14. The apparatus of claim 1, further comprising:

an open propulsor rotor; and a guide vane array comprising the variable guide vane, the guide vane array configured to de-swirl air propelled by the open propulsor rotor.

15. An apparatus, comprising:

an open rotor aircraft propulsion system comprising an airfoil;

the airfoil extending spanwise along an axis to a tip, the airfoil extending longitudinally along a camber line between a leading edge and a trailing edge, the airfoil extending laterally between a first side and a second side, and the airfoil comprising an acoustic structure;

the acoustic structure extending a length along the span of the airfoil, wherein the length is less than seventy-five percent of the span; and the acoustic structure including a first skin and a plurality of chambers within the airfoil, the first skin at least partially forming the first side, and a first of the plurality of chambers fluidly coupled with one or more perforations in the first skin.

16. The apparatus of claim 15, wherein the open rotor aircraft propulsion system includes a guide vane comprising the airfoil.

17. The apparatus of claim 15, wherein the airfoil is configured to pivot about the axis.

18. The apparatus of claim 15, wherein the open rotor aircraft propulsion system includes an open propulsor rotor; and a guide vane array comprising the airfoil, the guide vane array arranged with and downstream of the open propulsor rotor.

19. The apparatus of claim 15, wherein the open rotor aircraft propulsion system further includes an engine core and a housing for the engine core;

the housing includes a housing acoustic structure and an exterior side;

the housing acoustic structure includes an exterior skin and a plurality of housing chambers, the exterior skin at least partially forms the exterior side, and a first of the plurality of housing chambers is fluidly coupled with one or more perforations in the exterior skin; and the airfoil projects out from the housing at the exterior side.

20. An apparatus, comprising an open rotor aircraft propulsion system comprising an open propulsor rotor, an open guide vane array, an engine core and a housing for the engine core;

the guide vane array including a plurality of open guide vanes arranged circumferentially about and projecting out from an exterior side of the housing, a first of the plurality of open guide vanes comprising an airfoil;

the airfoil extending spanwise along an axis to a tip, the airfoil extending longitudinally along a camber line between a leading edge and a trailing edge, and the airfoil extending laterally between a pressure side and a suction side, and the airfoil comprising a vane acoustic structure; and the vane acoustic structure including a first skin and a plurality of chambers within the airfoil, the first skin at least partially forming the suction side, and a first of the plurality of chambers fluidly coupled with one or more perforations in the suction side.

* * * * *